(12) United States Patent
Matsuura et al.

(10) Patent No.: US 7,498,947 B2
(45) Date of Patent: Mar. 3, 2009

(54) ANTENNA CIRCUIT, IC INLET, MULTI TAG, AND METHOD FOR PRODUCING MULTI TAG

(75) Inventors: Katsuyoshi Matsuura, Tokyo (JP); Katsumi Katakura, Tokyo (JP); Taiga Matsushita, Tokyo (JP)

(73) Assignee: Lintec Corporation (JP)

( * ) Notice: Subject to any disclaimer, the term of this patent is extended or adjusted under 35 U.S.C. 154(b) by 302 days.

(21) Appl. No.: 11/640,935

(22) Filed: Dec. 19, 2006

(65) Prior Publication Data

US 2007/0159339 A1    Jul. 12, 2007

(30) Foreign Application Priority Data

Jan. 12, 2006    (JP)    ............... 2006-005179

(51) Int. Cl.
    *G08B 13/14*    (2006.01)
(52) U.S. Cl. .................. 340/572.7; 340/572.8
(58) Field of Classification Search ............ 340/572.1, 340/572.7, 572.8; 343/700 R, 725–730, 343/742, 893, 916; 29/600, 601, 825; 235/492
    See application file for complete search history.

(56) References Cited

U.S. PATENT DOCUMENTS

| | | | | |
|---|---|---|---|---|
| 5,574,470 | A  * | 11/1996 | de Vall | ............... 343/895 |
| 6,816,076 | B2 * | 11/2004 | Pomes | ............... 340/572.1 |
| 7,119,693 | B1 * | 10/2006 | Devilbiss | ............. 340/572.5 |
| 2007/0222613 | A1* | 9/2007 | Fidelis et al. | ........... 340/572.8 |

FOREIGN PATENT DOCUMENTS

| | | |
|---|---|---|
| JP | 11-328344 | 11/1999 |
| JP | 2001-101370 | 4/2001 |
| JP | 2002-342728 | 11/2002 |

* cited by examiner

*Primary Examiner*—Toan N Pham
(74) *Attorney, Agent, or Firm*—Bacon & Thomas, PLLC (57) ABSTRACT

An antenna circuit includes a plurality of antenna circuit units on a circuit substrate. The plurality of antenna circuit units includes: a large antenna circuit unit whose circuit size is large; and a small antenna circuit unit whose circuit size is smaller than the size of the large antenna circuit unit, the small antenna circuit unit provided inside the large antenna circuit unit and provided detachable from the large antenna circuit unit.

9 Claims, 7 Drawing Sheets

ANTENNA CIRCUIT, IC INLET, MULTI TAG, AND METHOD FOR PRODUCING MULTI TAG

CROSS-REFERENCE TO RELATED APPLICATION

This application claims, under 35 USC 119, priority of Japanese Application No. 2006-5179 filed Jan. 12, 2006.

BACKGROUND OF THE INVENTION

1. Field of the Invention

The present invention relates to an antenna circuit, an IC inlet, a multi tag, and a method for producing the multi tag.

2. Description of the Background Art

Recently, an IC tag of non-contact type has been used in various processing of the personal identification, the merchandise control, the physical distribution management, and the theft measures, etc.

For example, when used for the physical distribution management, one IC tag is attached to the article, and a confirmation machine (for example, reader/writer device etc.) can read or rewrite inside information of an IC chip that the IC tag mounts. As a result, it is possible to verify and manage information on the article of the actual thing by matching with management data in an upper level data base.

In a usual noncontact IC tag etc., one IC chip is mounted on one formed antenna circuit, a surface protection layer etc. are laminated thereon, and information is written by using the reader/writer device and/or surface print processing is applied.

Patent document 1 (Japanese Patent Publication Laid-Open No. 2001-101370) and patent document 2 (Japanese Patent Publication Laid-Open No. 1999-328344) describe antenna structures. An antenna structure that has large and small circuits design to attempt the stabilization of the communication property by an electromagnetic coupling is disclosed in patent document 1. Moreover, an IC card structure that can also respond to a different frequency by using a plurality of antennas and an IC module is disclosed in patent document 2.

Moreover, Patent document 3 (Japanese Patent Publication Laid-Open No. 2002-342728) describes a label structure of an IC tag. A structure that an adhesive layer in an opening of tag is adhered to adherent is disclosed in patent document 3.

Additionally, according to the use mode of the IC tag, in some cases, an IC tag into which the same information is written is attached on each of the plurality of articles to be used.

For example, when a certain article and other articles relating to the article is managed as a pair, a use mode of attaching the same IC tag to each article, and verifying/managing the identity and the relevancy of individual data etc. is considered.

However, when the IC tag of the conventional structure including patent documents 1 to 3 is used in this way, it is necessary that the IC tag in which the same information is written is prepared according to the number of sheets corresponding to the number of articles for attaching.

Therefore, since the cost of the IC tag increases in proportion to the number of sheets, and the same manufacturing of IC tags of data writing processing and surface print processing, etc. are necessary, the load of work also increases. Moreover, there is a problem related to an increase of the tag waste. In addition, the decrease in productivity and the loss of the material may be occurred in the IC tag production since the number of sheets of the IC tag that can be produced at one time decreases with increasing the size.

SUMMARY OF THE INVENTION

The present invention is achieved in consideration of the above-mentioned points, and the present invention aims to provide an antenna circuit and an IC inlet for manufacturing a plurality of tags that can be used at the same time, and a multi tag manufactured from these and a method for producing thereof.

The antenna circuit according to a first aspect includes a plurality of antenna circuit units on a circuit substrate, the plurality of antenna circuit units including: a large antenna circuit unit whose circuit size is large; and a small antenna circuit unit whose circuit size is smaller than the size of the large antenna circuit unit, the small antenna circuit unit provided inside the large antenna circuit unit and provided separatable from the large antenna circuit unit.

The antenna circuit according to a second aspect includes a cutting off part provided to separate the small antenna circuit unit to separate in the first aspect.

The IC inlet according to a third aspect is configured to mount IC chips on an antenna circuit, the antenna circuit including a plurality of antenna circuit units on the circuit substrate, the plurality of antenna circuit units including: a large antenna circuit unit whose circuit size is large; and a small antenna circuit unit whose circuit size is smaller than the size of the large antenna circuit unit, the small antenna circuit unit provided inside the large antenna circuit unit and provided detachable from the large antenna circuit unit.

The IC inlet according to a fourth aspect further includes a cutting off part provided to separate the small antenna circuit unit to separate in the third aspect.

The multi tag according to a fifth aspect includes a plurality of tags, the plurality of tags including: a large tag whose circuit size is large; and a small tag whose circuit size is smaller than the size of the large tag, the small tag provided inside the large tag and provided to separate from the large tag.

The multi tag according to a sixth aspect further includes a cutting off part provided to separate the small tag to separate in the above aspect.

In the multi tag according to a seventh aspect, the plurality of tags includes IC tags in the sixth aspect.

The method for producing a multi tag according to an eighth aspect includes the steps of: forming a large antenna circuit unit whose circuit size is large and a small antenna circuit unit whose circuit size is smaller than the size of the large antenna circuit unit on a circuit substrate, the small antenna circuit unit formed inside the large antenna circuit unit; mounting an IC chip on the large antenna circuit unit and the small antenna circuit unit; processing a predetermined tag by sealing each of the antenna circuit; and forming a cutting off part to make a small tag formed with the tag processing step to separate.

The method according to a ninth aspect includes that the forming step of creating the large tag and the small tag is executed at the same time in the above aspect.

Thus, the plurality of circuit units can be formed on the circuit substrate. Therefore, neither the amount of the material nor the workload necessary for a conventional circuit manufacturing are changed by forming the small circuit unit with the same manufacturing step inside the large circuit unit, and a plurality of circuits that has the identical function and/or the correspondence function can be created at the same time. As a result, the plurality of tags used at the same time can be efficiently produced.

DESCRIPTION OF THE PREFERRED EMBODIMENTS (A) First Embodiment

Hereafter, a first embodiment according to the present invention of an antenna circuit, an IC inlet, a multi tag, and a method for producing the multi tag will be explained referring to the drawing.

(A-1) Configuration of the First Embodiment

Figure 1:
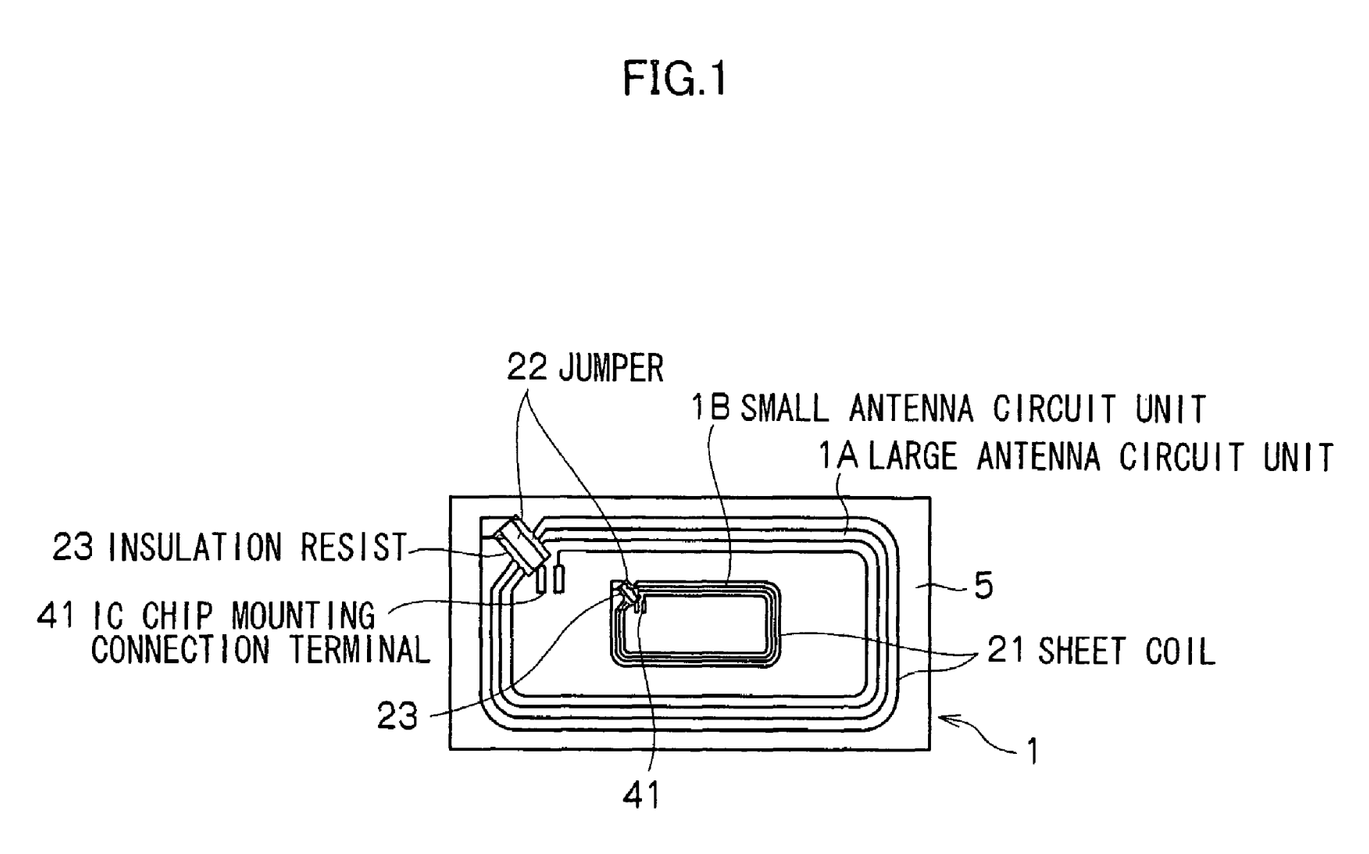
FIG. 1 is a configuration diagram showing an antenna circuit according to a first embodiment.
Figure 2:
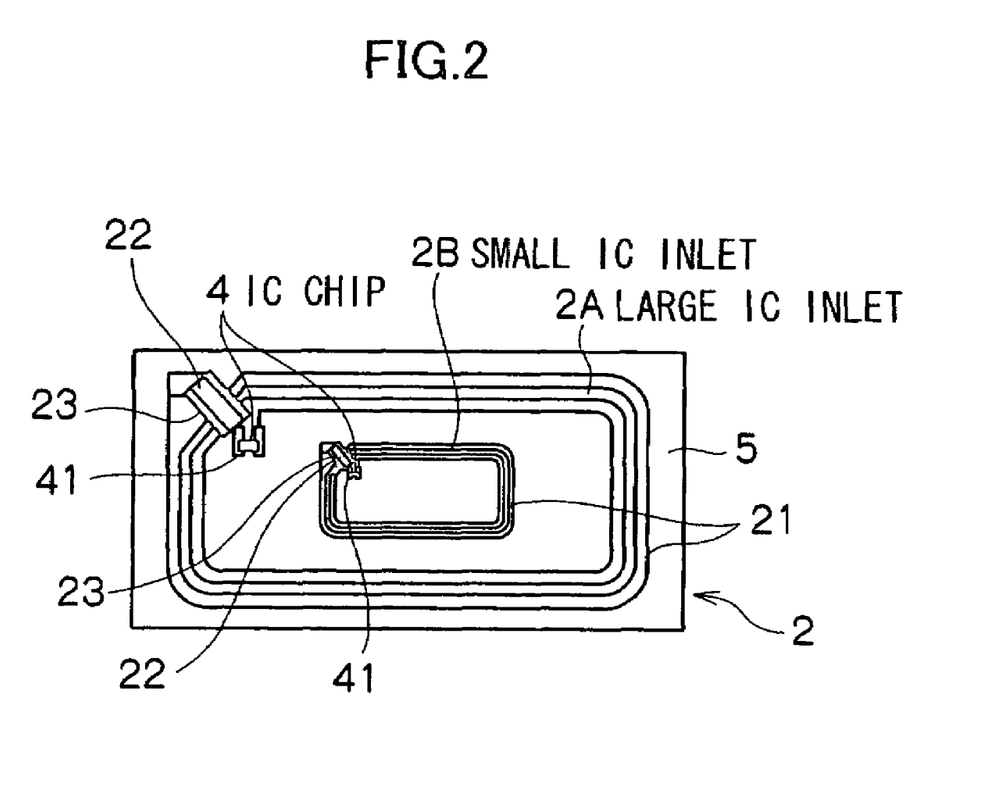
FIG. 2 is a configuration diagram showing an IC inlet according to the first embodiment.
Figure 3:
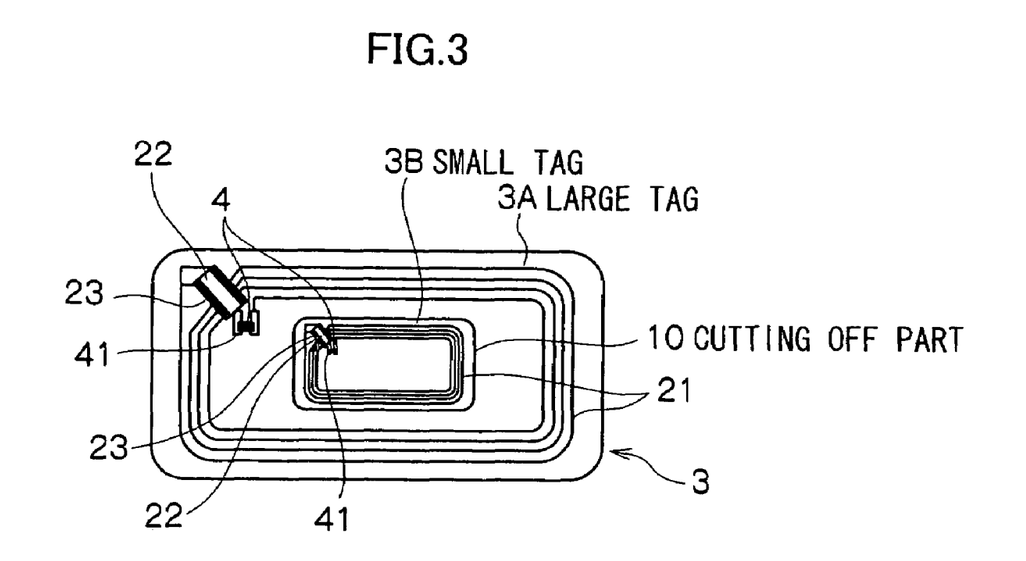
FIG. 3 is a configuration diagram showing an IC tag according to the first embodiment.

FIG. 1 is an illustration for explaining an example of configuring an antenna circuit according to the present embodiment, FIG. 2 is an illustration for explaining an example of configuring an IC inlet according to the present embodiment, and FIG. 3 shows an example of a shape of a multi tag by processing tag according to the present embodiment.

Figure 4:
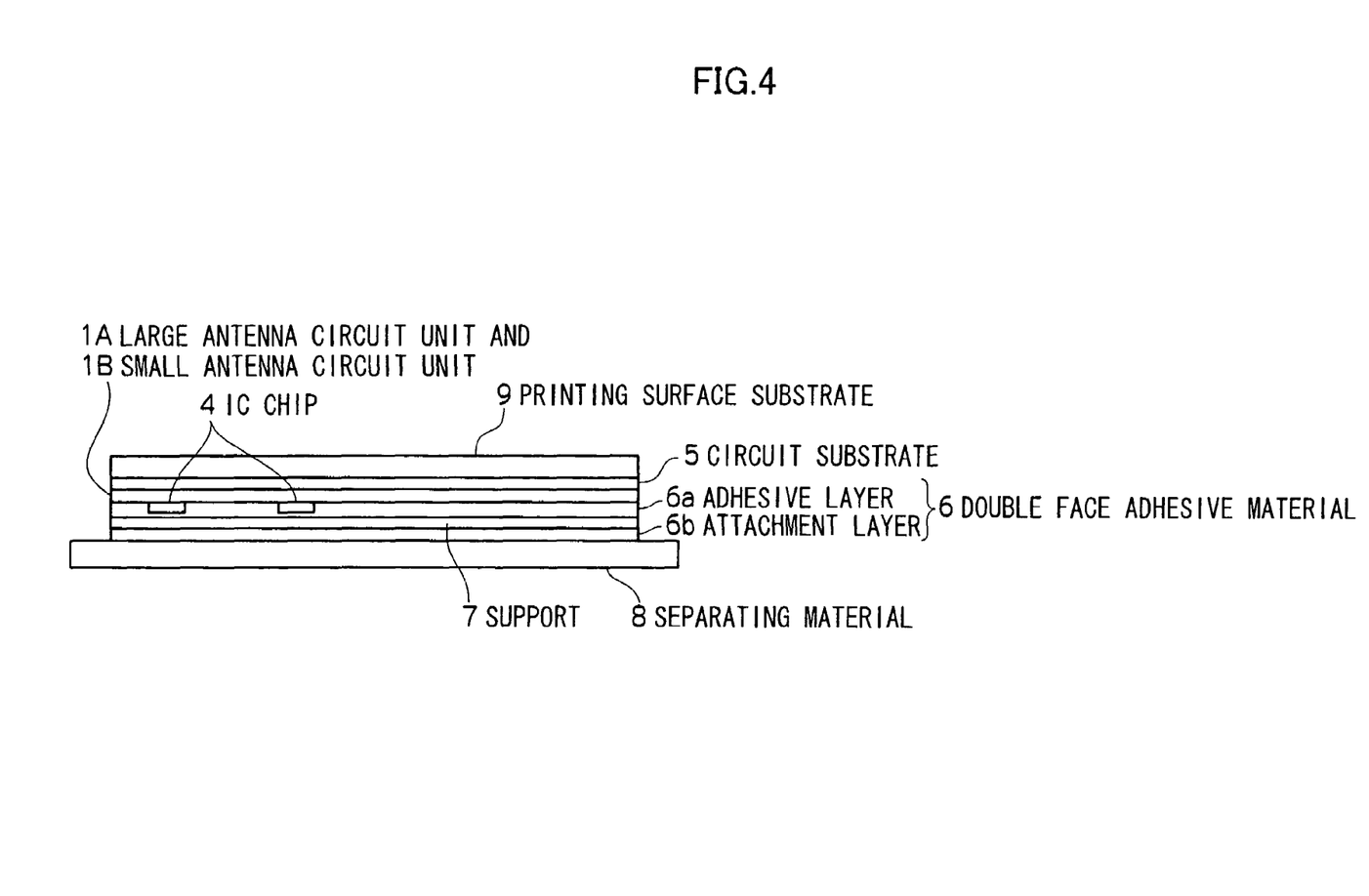
FIG. 4 is cross-sectional drawing showing the IC tag according to the first embodiment.

Here, the IC inlet indicates a circuit in the state of FIG. 2 where an IC chip 4 is mounted on an IC chip mounting connection terminal 41 of a large antenna circuit unit 1A and/or a small antenna circuit unit 1B in FIG. 1. Moreover, FIG. 3 shows a tag shape after processing tag, and the cross section configuration is shown in FIG. 4.

As shown in FIG. 1, in an antenna circuit 1 according to the present embodiment, two different sized large antenna circuit unit 1A and small antenna circuit units 1B are provided on the same plane of a circuit substrate 5 respectively. The size of the large antenna circuit unit 1A is larger than the size of the small antenna circuit unit 1B, and the small antenna circuit unit 1B is formed inside a sheet coil 21 which constitutes the large antenna circuit unit 1A.

The small antenna circuit unit 1B is separatably spaced from the inside the sheet coil 21 and the IC chip mounting connection terminal 41 of the large antenna circuit unit 1A. By spacing like this, it is separatable without disrupting the sheet coil 21 by using separating means such as scissors and cutters. The spacing is preferably 0.5 mm or more, and furthermore preferably 2.0 mm or more.

Each of the large antenna circuit unit 1A and the small antenna circuit unit 1B is basically the same configuration, and can be formed with the same manufacturing step at the same time. Moreover, an IC inlet 2 of FIG. 2 and an IC tag 3 of FIG. 3 can also form the small and large inlet and the small and large tag at the same time. Hereafter, the configuration of the large antenna circuit unit 1A and the small antenna circuit unit 1B shown in FIG. 1 will be explained.

Each of the large antenna circuit unit 1A and the small antenna circuit unit 1B has the sheet coil 21, a jumper 22, an insulation resist 23, and the IC chip mounting connection terminal 41 on the plane of the circuit substrate 5, and then becomes a closed circuit when the IC chip is mounted on the IC chip mounting connection terminal 41 afterwards.

Sheet materials of plastic films such as polyethylene, polypropylene, polyethylene terephthalate, polyvinyl chloride, polyimide, and polycarbonate, or paper materials etc. such as woodfree paper, coat paper, glassine paper, and non-woven cloth can be used as the circuit substrate 5. Although the thickness of the circuit substrate 5 is not especially limited, 5 to 300 μm are preferable, and 10 to 200 μm are especially preferable.

The sheet coil 21 mainly bears an antenna function, for example, conductive materials such as copper, aluminum, or other types of metal, and conductive inks such as silver pastes are spirally wound in a rectangular shape consecutively. Moreover, each number of turns, the line width and the line spacing of the sheet coils 21 of the large antenna circuit unit 1A and the small antenna circuit unit 1B are respectively predetermined to be a desired resonance frequency. In the present embodiment, the edge (outermost edge) located outside of the sheet coil 21 is connected with one side electrode of the IC chip mounting connection terminal 41 located inside the sheet coil 21 through a jumper 22. Moreover, the edge (innermost edge) located inside the sheet coil 21 is connected with the other electrode of the IC chip mounting connection terminal 41.

Conductive pastes or conductive inks having dispersed metallic particles such as silvers and nickels can be used as the jumper 22.

The jumper 22 connects inside the sheet coil 21 with the outer edge of the sheet coil 21 electrically. Moreover, an insulation resist 23 is located under the jumper 22, and the insulation resist 23 applies insulation between the jumper 22 and each loop of the sheet coil 21.

Examples of the insulating resin containing an acryl resin, an urethane resin, and an acrylic urethane resin, etc. as main ingredients can be used as the insulation resist 23.

The IC chip mounting connection terminal 41 is a pair of electrode for mounting the IC chip 4. As mentioned above, when the IC chip 4 is mounted on each IC chip mounting connection terminal 41 of the antenna circuits 1A and 1B shown in FIG. 1, a closed circuit is configured. The metal and conductive material used by the sheet coil 21 can be used as the IC chip mounting connection terminal 41.

In FIG. 2, as for a large IC inlet 2A and a small IC inlet 2B, the IC chips 4 are mounted on each IC chip mounting connection terminal 41 of the large antenna circuit unit 1A and the small antenna circuit unit 1B in FIG. 1. The IC chips 4 mounted on each of the large antenna circuit unit 1A and the small antenna circuit unit 1B respectively may be the same or may be different respectively. Although it is necessary to change the types of the chips set to a mounting machine for IC chip when a different IC chip is mounted, it is possible to form with the same manufacturing step respectively.

Solder, anisotropic conductive adhesives, and anisotropic conductive adhesive films, etc. can be used as a connecting material used to mount the IC chip 4. Examples of material containing epoxy resin etc. having dispersed metallic particles etc. as main ingredients can be used as anisotropic conductive adhesives and anisotropic conductive adhesive films.

FIGS. 3 and 4 show examples of configuring an IC tag 3. The IC tag 3 is formed so that the IC chip 4 is mounted on each IC chip mounting connection terminal 41 of the large antenna circuit unit 1A and the small antenna circuit unit 1B; a double face adhesive material 6 that seals the IC chip 4, the large antenna circuit unit 1A, and the small antenna circuit unit 1B are stuck together; a printing surface substrate 9 for printing visual information is stuck on the other surface; and then die-cutting is performed into the predetermined shape.

The printing surface substrate 9 only has to be stuck together if necessary, and need not be provided especially. In addition, the double face adhesive material 6 may be stuck on the opposite side of a mounting surface of the IC chip 4, and in that case it only has to stick the printing surface substrate 9 on the mounting surface of the IC chip 4 if necessary.

In FIG. 3, the IC tag 3 is a tag that the large IC tag 3A (large tag) and the small IC tag 3B (small tag) are formed at the same time in the same manufacturing step, and is a separatable multi tag formed by spacing small tag 3B from the large tag 3A. Moreover, the small tag 3B is formed inside the large tag 3A as for the IC tag 3.

In each die-cutting processing of the large tag 3A and the small tag 3B, the tag shape can be arbitrary, such as a round, a triangle, a quadrangle, and a hexagon, etc. Moreover, the large tag 3A and the small tag 3B formed by the die-cutting processing can have the same shape or different shape.

The same information and/or correspondence information are written in each IC chip 4 of the large tag 3A and small tag 3B. Therefore, although the size is different, the large tag 3A and the small tag 3B can be used as IC tags for the same function and/or the correspondence function respectively. That is, since two IC tags that have the same function and/or the correspondence function can be produced with the implementation phase of one time, and the small tag 3B can be produced by effectively using the circuit substrate 5 etc. inside the large tag 3A, a plurality of IC tags can be produced by raising productive efficiency and material efficiency.

Moreover, a cutting off part 10 is preferably formed for cutting off the small tag 3B from the large tag 3A at the time of print processing and the die-cutting processing etc. of manufacturing step. If the small tag 3B can be cut off in the forming, this cutting off part 10 can be applied widely, for instance, by using a die-cutting process by a perforated line and a half-cut etc. Furthermore, the cutting off part 10 may be formed by making tiny holes therearound by punching etc. like a stamp, and if it is separatable, the shape is not especially limited.

Next, the cross section configuration after tag processed to the IC tag 3 of FIG. 3 will be explained referring to FIG. 4.

The double face adhesive material 6 comprises a support 7, an adhesive layer 6a, and an attachment layer 6b. The double face adhesive material comprising of the monolayer of the adhesive layer without the support 7 is acceptable as the modification example of the double face adhesive material 6.

For example, the support 7 constituting the double face adhesive material 6 can be used by a plastic film, paper, and nonwoven cloth, etc. For example, in the case where a plastic film is used, although various materials are used, materials such as polyethylene terephthalate, polypropylene, polyvinyl chloride, polyurethanes, and polyimide can for example be used. Moreover, the thickness of the support 7 that uses such a material is preferably 10 to 100 μm, and especially preferably 12 to 80 μm.

The adhesive layer 6a is a layer, provided on one surface of the support 7, for following and sealing the convexo-concave of IC chips 4 mounted on each of the large antenna circuit unit 1A and the small antenna circuit unit 1B. If the adhesive layer 6a has an adequate adhesive strength that can adhere the IC chip 4, the large antenna circuit unit 1A and the small antenna circuit unit 1B to the support 7, the material is not especially limited and can be applied widely. For example, the adhesives such as rubber type, acrylic type, silicone type, and polyurethane type can be used for the adhesive layer 6a. In particular, the acrylic pressure sensitive adhesive has excellent adhesive strength. Moreover, the thickness of the adhesive layer 6a is preferably 5 to 100 μm, and especially preferably 10 to 70 μm.

The attachment layer 6b is an adhesive layer, provided on the other surface of support 7, for sticking the IC tag 3 and a adherent (article such as commodities for example) together. Moreover, a release material 8 is provided for protecting the attachment layer 6b on the surface of the attachment layer 6b. Moreover, if the attachment layer 6b can stick the IC tag 3 together on the adherent without easily peeling off from the adherent, the material of the attachment layer 6b can be applied widely and, for instance, adhesives such as rubber type, acrylic type, silicone type, and polyurethane type can be used. The attachment layer 6b preferably has a thickness of 5 to 100 μm, and especially preferably 10 to 70 μm, as well as the adhesive layer 6a.

The release material 8 is used to protect the attachment layer 6b, and the release agent layer is preferably provided at least on the surface to contact with the attachment layer 6b. For example, paper such as polyethylene laminated paper, coat paper, and glassine paper, as well as plastic films etc. such as polyethylene, polypropylene, and polyethylene terephthalate can be used as the release material 8. Moreover, silicone resin, fluororesin, and long-chain alkyl type resin, etc. can be used for example as the release agent used for the release agent layer. The release material 8 preferably has a thickness of 5 to 300 μm, and especially preferably 10 to 200 μm. The thickness of the release agent layer is not limited, and can be selected according to the usage.

The printing surface substrate 9 is provided on one surface of the IC inlet as needed, and is the substrate for printing, for instance, the visual information on merchandise information, etc. or for protecting the IC inlet. For example, the visual information on merchandise information (item code and trade name, etc. for example) and a price, a bar code, a pattern, and a mark, etc. is printed on the printing surface substrate 9. Moreover, the printing surface substrate 9 preferably has printability on the surface, and the material can be applied widely and, for instance, a plastic film, a synthetic paper, a nonwoven cloth, and paper, etc can be used. Moreover, the substrate that forms various recording layers for a thermosensitive recording, a pressure sensitive recording, a thermal transfer recording, a laser beam recording, and an ink jet recording, etc. can optionally be used. Moreover, the printing surface substrate 9 may be a transparent substrate or it may be an opaque substrate. The thickness of the printing surface substrate 9 is not especially limited, is preferably 5 to 200 μm, and especially preferably 10 to 150 μm. The printing surface substrate 9 can be laminated by using, for example, bonds such as polyethylene, polypropylene, and polyester, or adhesives similar to the adhesive layer 6a. These bonds and adhesives (not shown) preferably have a thickness of 5 to 100 μm, and especially preferably 10 to 70 μm, as well as the adhesive layer 6a.

(A-2) Method for Producing IC Tag According to the First Embodiment

Next, a method for producing the IC tag 3 according to the first embodiment will be explained as follows.

Step 1: Conductive layers of the sheet coil 21 of the large antenna circuit unit 1A and the IC chip mounting connection terminal 41, and conductive layers of the sheet coil 21 of the small antenna circuit unit 1B and the IC chip mounting connection terminal 41 are formed on a sheet material as the circuit substrate 5 at the same time.

This conductive layer can be formed by applying: a formation method in which a copper foil or an aluminum foil formed in the predetermined coil shape by the die-cutting etc. on the circuit substrate 5 stick together through the adhesion layer (not shown); a formation method in which etching resist printing is performed by screen printing etc. on the metallic layer after metallic layer is formed with, for example, ion plating or deposition, etc. on the circuit substrate 5, and an exposed portion is formed in coil shape by etching treatment; and a formation method such as formation etc. with screen printing etc. in the predetermined coil shape by using metallic pastes such as silver pastes. Moreover, as for the formation of this conductive layer, the kind of the conductive material is not limited.

In addition, in the formation method of the conductive layer, the material that the adhesion layer is prepared in advance to a copper foil or an aluminum foil, etc may be used.

Step 2: An insulating layer as the insulation resist 23 of the large antenna circuit unit 1A and an insulating layer as the insulation resist 23 of the small antenna circuit unit 1B are formed at the same time.

Any existing method can be applied to the formation method of this insulating layer, and the kind of the insulating material is not limited. In addition, it is easy to apply the screen printing since the formed area is small.

Step 3: A conductive layer as the jumper 22 of the large antenna circuit unit 1A and a conductive layer as the jumper 22 of the small antenna circuit unit 1B are formed at the same time.

This conductive layer can be formed by applying either of formation methods such as print processing by a screen printing that use a metal paste and laminating of a metal foil, etc., and the kind of the conductive material is not limited.

As mentioned above, the conductive layer and the insulating layer constituting the large antenna circuit unit 1A and the small antenna circuit unit 1B can be completed by the same forming step. The above-mentioned Step 1, Step 2 and Step 3 correspond to the antenna circuit unit forming step.

Step 4: The predetermined IC chip 4 is mounted at the same time for each of the IC chip mounting connection terminal 41 of the large antenna circuit unit 1A and the small antenna circuit unit 1B, and then the large IC inlet 2A and the small IC inlet 2B are formed at the same time. Here, after a connecting material (solder, anisotropic conduction material, and anisotropic conductive adhesives, etc. for example) is provided to the IC chip mounting connection terminal 41 in advance, the IC chip 4 is mounted. Step 4 corresponds to the IC chip mounting step.

Step 5: After the formation and mounting of the electric circuit element are completed, the large tag 3A and the small tag 3B (an arbitrary shape form of, for example, a card shape, a label shape, and a seal shape, etc.) are formed at the same time by performing a surface cover etc. by using adhesives and/or bonds, etc. by the printing surface substrate 9. Step 5 corresponds to the tag processing step.

Step 6: The predetermined visual information is printed on the printing surface substrate 9 of the formed large tag 3A and small tag 3B, the cutting off part 10 for cutting off the large tag 3A and the small tag 3B is formed, and the IC tag according to the present embodiment is completed. The forming cutting off part 10 can be performed by using die-cutting, etc. with a punching or a blanking blade. Step 6 corresponds to the cutting off part forming step.

(A-3) Usage Example of IC Tag According to the First Embodiment

Next, the example of the usage of the large tag 3A and the small tag 3B that are separatable multi tags according to the first embodiment shown in FIG. 3 will be explained.

For example, in use, they are used by that one of the IC tags is attached to one of two articles to be managed by a set, and then the other IC tag is attached to the other article.

As such an usage example, when belongings are checked in a cloakroom at a hotel for example, one IC tag is attached to the belongings, a hotel staff attaches the other IC tag to a belonging exchange ticket, and the belonging exchange ticket is handed over to a guest. And then, information on both the IC tags is related and recorded into a server. When belongings are handed over, it is possible to apply to a system that manages belongings by collation with the information in the server by using the inside information on both the IC tags. Moreover, for example, in an amusement park and a tourist site, etc., one IC tag (for management) is attached to a parent's ticket among family guest tickets, and the other IC tag (for being managed) is attached to a child's ticket. And then, for example, it is possible to apply to a system that looks for the parent or the child by using the inside information of both IC tags when the child is lost.

In addition, in case where a tag whose center part is lacked, it can be easily checked visually that the other article that should be managed by a set exists. The relevancy of both the IC tags can be checked visually by printing the visual information related to both the IC tags.

As mentioned above, according to the present embodiment, a plurality of circuits can be manufactured at the same time without changing the amount of the material or the workload necessary for a conventional circuit manufacturing by forming the small circuit inside the large circuit with the same manufacturing step. Therefore, the plurality of IC tags used at the same time can be efficiently manufactured.

Moreover, according to the present embodiment, since it is possible to divide an IC tag from a set of IC tags and attach the IC tag on each of the plurality of articles, the set management of those articles is easy.

(B) Other Embodiments (B-1) The above embodiment explains, as an example, the one side circuit that forms the circuit only on the one surface of the circuit substrate 5. However, it is not prevented to form a part of the circuit element on the other surface to form the circuit by the double face of the circuit substrate 5. For example, it may form all or a part of the small IC tag with the other surface of the circuit substrate 5. Moreover, for example, a jumper part of the IC tag may be provided on the other surface of the circuit substrate 5 by using a through hole etc. The position of the jumper part and the IC chip mounting connection terminal etc. is not especially limited.

Moreover, although the case where one small antenna circuit unit is formed inside the circuit of one large antenna circuit unit has been shown in FIG. 1 in the embodiment mentioned above, two or more small antenna circuit units may be formed. In addition, one or a plurality of smaller antenna circuit units may be formed inside the small antenna circuit unit inside the large antenna circuit unit. In this case, the two or more smaller antenna circuit units each may have a different size.

Moreover, although the shape of the circuit has been shown as rectangular shape, it may be formed in other shapes (for example, round, triangle, quadrangle, and hexagon, etc.) according to the use mode. In addition, the shape of the large size circuit and the shape of the small size circuit may respectively be different.

(B-2) The above embodiment explains the case where the same information is written in both of the IC chips 4 mounted on each of the large tag 3A and small tag 3B. However, different information may be written in them respectively. In this case, information is written by specifying information written with a writer apparatus by identification information by using the identification information of each IC chip 4, for example.

Moreover, the IC chip 4 with a different kind may be mounted on each large tag 3A and small tag 3B. For example, the large tag 3A can manage storage information on the IC chip 4 of the small tag 3B by enlarging a memory capacity of the IC chip 4 mounted on the large tag 3A more than that of the small tag 3B.

Figure 6A:
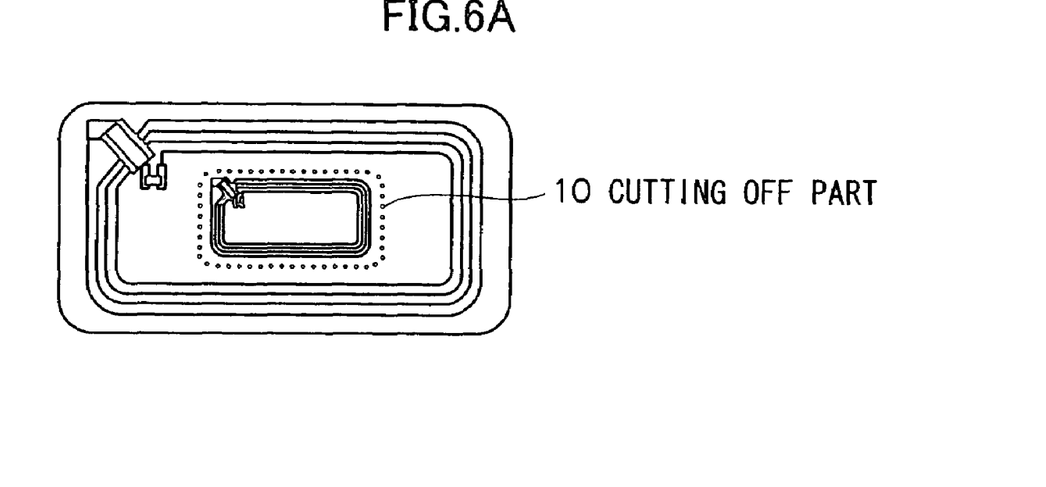
FIG. 6A is an illustration showing a modification example of a cutting off part (version 1)
Figure 6B:
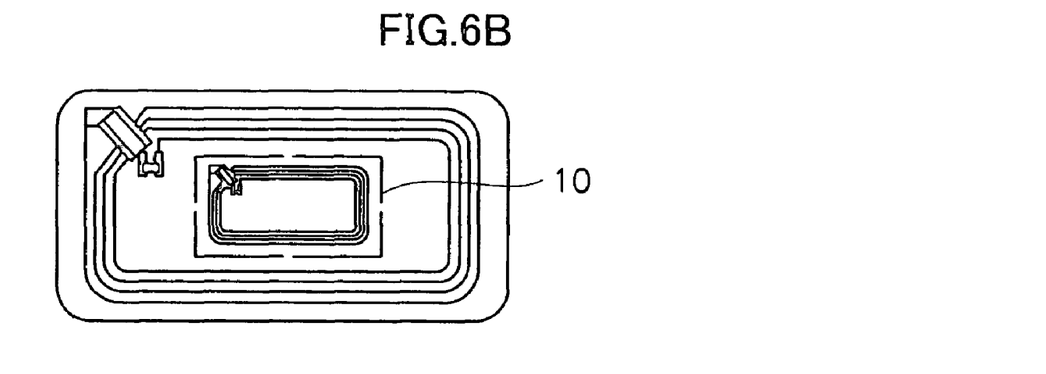
FIG. 6B is an illustration showing the modification example of the cutting off part (version 2)
Figure 6C:
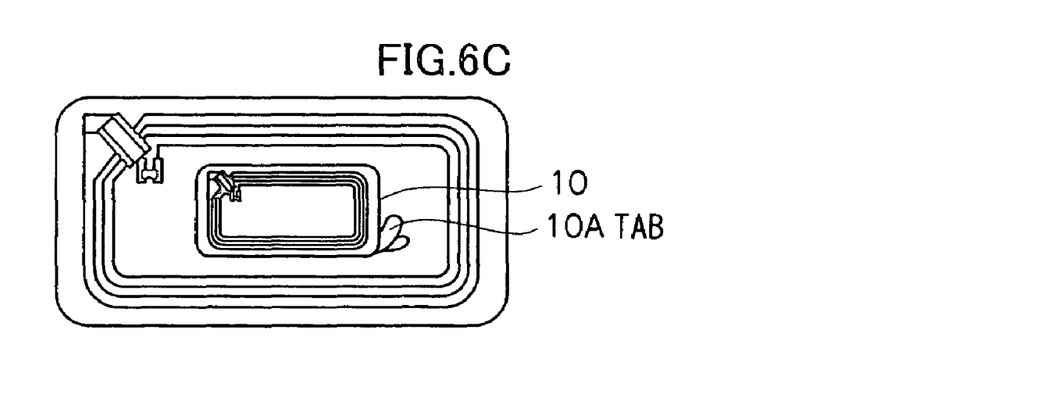
FIG. 6C is an illustration showing the modification example of the cutting off part (version 3)

(B-3) FIGS. 6A to 6C shows examples of the cutting off part 10 of the small tag 3B. In the embodiment mentioned above, although the die-cutting process by the perforated line and the half-cut has been shown as an example of the cutting off part 10, various cutting off parts can be applied if the small IC tag 3B can be divided and separated.

An example of the cutting off part 10 of FIG. 6A indicates the case where the perforated line is formed into a round shape with punching etc. as used for a stamp etc. for example. Moreover, the cutting off part 10 of FIG. 6B shows a case where, for example, the small tag 3B is supported and connected in four places, and cut is made in the other places. In addition, although FIG. 6B shows the case where the support connection part is provided in one place each side, the support connection part may be provided, for example, at each corner besides this.

Moreover, FIG. 6C indicates the case where a tab 10A is provided in order that the small tag 3B is cut off or peeled off easily. Thus, the IC tag 3B can be divided and separated without destroying the mounted IC chip 4 by providing the tab 10A. From the viewpoint that destruction of the IC chip 4 is prevented, it is preferable that the position where each IC chip mounting connection terminal 41 of the large antenna circuit unit 1A and the small antenna circuit unit 1B is formed is on the same side on the circuit substrate 5.

Figure 7:
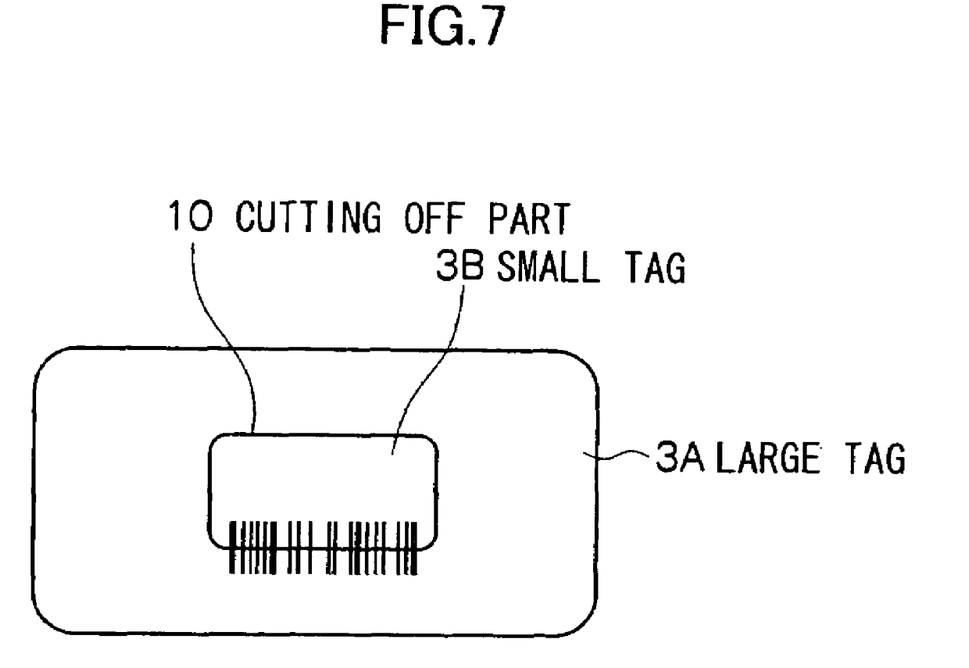
FIG. 7 is an illustration showing a modification example of a print processing.

(B-4) FIG. 7 shows an example of printing a bar code to the printing surface substrate 9. As shown in FIG. 7, the same information can be tallied and printed in both of the large tag 3A and the small tag 3B during the same print processing by printing the bar code in a common part of the large tag 3A and the small tag 3B. As a result, the relevancy of two IC tags can be checked visually. In addition, although a one-dimensional bar code is illustrated in FIG. 7, it is not limited to this. A two-dimensional bar code is acceptable, or other visual information commonly printed in both of the large tag 3A and the small tag 3B is acceptable.

EXAMPLE

Next, since the IC tag 3 of the first embodiment has been produced, the production method and the characteristic thereof will be explained.

First of all, a copper foil film laminate (NIKKAN INDUSTRIES Co., Ltd.: trade name "NIKAFLEX") to which the copper foil (35 μm in thickness) is laminated in advance for a film of polyethylene terephthalate (PET) resin (50 μm in thickness) as the circuit substrate 5 was used.

An etching resist pattern was printed by a screen printing in order to form an antenna circuit to this copper foil surface. At this time, an outside size of the large antenna circuit unit 1A was set to 32 mm in length and 61 mm in width, and the sheet coil 21 was set to line width 200 μm, line spacing 400 μm, and 7 times of the turn number. On the other hand, an inside size of the small antenna circuit unit 1B was set to 16 mm in length and 22 mm in width, and the sheet coil 21 was set to line width 130 μm, line spacing 120 μm, and 14 times of the turn number. Subsequently, an unnecessary copper foil was removed by etching, and the conductive layer of the large antenna circuit unit 1A and the small antenna circuit unit 1B was formed at the same time.

Next, each insulation resist 23 of the large antenna circuit unit 1A and the small antenna circuit unit 1B was formed with a screen printing at the same time by using an acrylic resin type insulation resist agent (made of Acheson (Japan) Limited.: trade name "ML25089").

Furthermore, each jumper 22 of the large antenna circuit unit 1A and the small antenna circuit unit 1B was formed with a screen printing at the same time by using a silver paste (made of Toyobo Co., Ltd.: trade name "DW250L-1"). As a result, the circuit shown in FIG. 1 was produced.

Subsequently, a RFID-IC chip 4 (made of Phillips Ltd.: trade name "I-CODE") was mounted on each IC chip mounting connection terminal 41 of the large antenna circuit unit 1A and the small antenna circuit unit 1B by using a flip chip mounting machine (made of Kyushu Matsushita Electric Co., Ltd.: trade name "FB30T-M"). At this time, the IC chip 4 was mounted by performing thermocompression bonding by using the anisotropy conductive adhesive (made of KYOCERA Chemical Corporation: trade name "TAP0402E") as a connected material in the condition at 200° C. in temperature, pressure 300 gf, and time 10 sec. As a result, the IC inlet shown in FIG. 2 was produced.

After the IC chip 4 was mounted, the IC chip 4, the large antenna circuit unit 1A, and the small antenna circuit unit 1B on the circuit substrate 5 were sealed with the double face adhesive material 6 (made of Lintec Corporation: trade name "PET25W PAT1"). Moreover, the printing surface substrate 9 (made of Lintec Corporation.: trade name "FR3412-50") applied with adhesives in advance was stuck on the other surface of the circuit substrate 5, the tag processing was applied, and the predetermined shape was made by blanking with a blanking machine (made of Lintec Corporation: trade name "LPM-300.55.D.R"). Moreover, in order to cut off, the perforated line was formed between the large antenna circuit unit 1A and the small antenna circuit unit 1B from the printing surface substrate 9 to the attachment layer 6b, excluding the release material 8 in FIG. 4, by using a blanking blade having a perforated line. As a result, 20 pieces of the IC tag shown in FIG. 3 were produced. In addition, in this example, size of the large IC tag 3A was set to 35 mm in length and 65 mm in width, and size of the small IC tag 3B was set to 20 mm in length and 30 mm in width.

The IC tag function of the large tag 3A and the small tag 3B produced by the production method mentioned above was confirmed by the following test method.

The I-CODE evaluation kit made of Phillips Ltd., trade name "SLEV400" was used for Read/Write examination concerning RFID and simultaneous reading examination of a plurality of large tag 3A and small tag 3B.

Moreover, a resonance waveform/resonance frequency examination was performed as follows. A coaxial cable was connected to trade name "Network analyzer 8712ET" made of Agilent Technologies Ltd., a loop shaped jig was installed in the tip portion, and the looped shaped jig was brought close to the sample and measurement was performed.

First of all, as shown in FIG. 3, the examination was performed while fitting the small tag 3B inside the large tag 3A without cutting off the small tag 3B. In this case, the resonance waveform/resonance frequency test result showed that the resonance frequency of the large tag 3A was 12.7 MHz, and the resonance frequency of the small tag 3B was 14.7 MHz.

Figure 5:
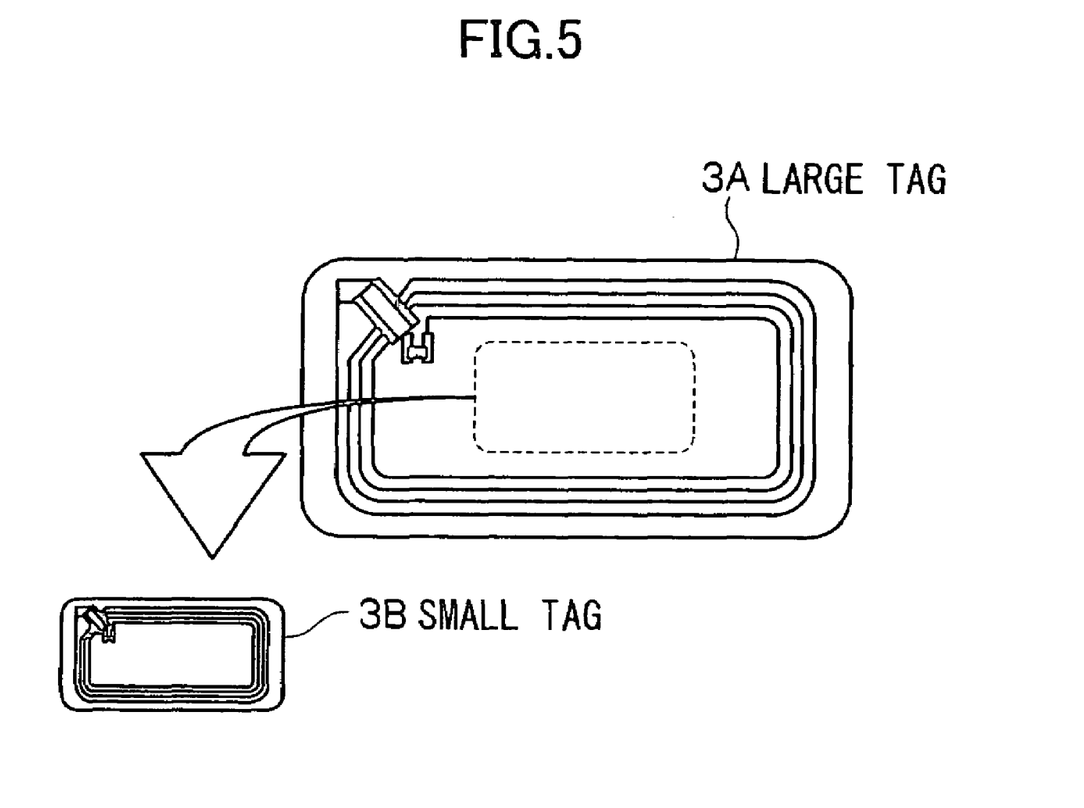
FIG. 5 is a configuration diagram showing an IC tag used for an example according to the first embodiment.

Next, the small tag 3B was cut off as shown in FIG. 5, and then each of the large tag 3A and the small tag 3B was examined. In this case, the resonance waveform/resonance frequency test result showed that the resonance frequency of the large tag 3A was 13.6 MHz, and the resonance frequency of the small tag 3B was 13.8 MHz.

In any case before and after separating, when the operation of the RFID circuit was demonstrated, the result showed that both of the large tag 3A and small tag 3B determined had adequate Read/Write function with all IC tags although the resonance frequency was slightly different before and after separating. Moreover, although the center part of the separated large tag 3A was lacked, the result showed that the Read/Write functions had no problem.

What is claimed is:

1. An antenna circuit comprising:
   a plurality of antenna circuit units on a circuit substrate, the plurality of antenna circuit units including:
   a large antenna circuit unit whose circuit size is large; and
   a small antenna circuit unit whose circuit size is smaller than the size of the large antenna circuit unit, the small antenna circuit unit provided inside the large antenna circuit unit and provided detachable from the large antenna circuit unit.

2. The antenna circuit according to claim 1, further comprising a cutting off part provided to separate the small antenna circuit unit.

3. An IC inlet configured to mount an IC chip on an antenna circuit, the antenna circuit comprising:
   a plurality of antenna circuit units on a circuit substrate, the plurality of antenna circuit units including:
   a large antenna circuit unit whose circuit size is large; and
   a small antenna circuit unit whose circuit size is smaller than the size of the large antenna circuit unit, the small antenna circuit unit provided inside the large antenna circuit unit and provided to separate from the large antenna circuit unit.

4. The IC inlet according to claim 3, further comprising a cutting off part provided to separate the small antenna circuit unit.

5. A multi tag comprising:
   a plurality of tags, the plurality of tags includes:
   a large tag whose circuit size is large; and
   a small tag whose circuit size is smaller than the size of the large tag, the small tag provided inside the large tag and provided to separate from the large tag.

6. The multi tag according to claim 5, further comprising a cutting off part provided to separate the small tag.

7. The multi tag according to claim 5 or 6, wherein the plurality of tags include IC tags.

8. A method for producing a multi tag, the method comprising the steps of:
   forming a large antenna circuit unit whose circuit size is large and a small antenna circuit unit whose circuit size is smaller than the size of the large antenna circuit unit on a circuit substrate, the small antenna circuit unit formed inside the large antenna circuit unit;
   mounting an IC chip on the large antenna circuit unit and the small antenna circuit unit;
   processing a predetermined tag by sealing each of the antenna circuit; and
   forming a cutting off part to make a small tag formed with the tag processing step to separate.

9. The method according to claim 8, wherein the forming step of creating the large tag and the small tag is executed at the same time.

* * * * *